United States Patent
Smirnov

(10) Patent No.: US 11,681,139 B2
(45) Date of Patent: Jun. 20, 2023

(54) CAMERA MODULE

(71) Applicant: Samsung Electro-Mechanics Co., Ltd., Suwon-si (KR)

(72) Inventor: Viatcheslav Smirnov, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 260 days.

(21) Appl. No.: 17/072,680

(22) Filed: Oct. 16, 2020

(65) Prior Publication Data

US 2021/0294092 A1 Sep. 23, 2021

(30) Foreign Application Priority Data

Mar. 19, 2020 (KR) ......................... 10-2020-0034078

(51) Int. Cl.
*G02B 26/08* (2006.01)
*G02B 7/18* (2021.01)
*G02B 13/00* (2006.01)

(52) U.S. Cl.
CPC ............... *G02B 26/08* (2013.01); *G02B 7/18* (2013.01); *G02B 13/0065* (2013.01)

(58) Field of Classification Search
CPC ...... G02B 26/08; G02B 7/18; G02B 13/0065; G02B 26/0816; G02B 26/0883; G02B 7/1821; H04N 5/2254; G03B 17/17
See application file for complete search history.

(56) References Cited

U.S. PATENT DOCUMENTS

| 7,667,897 B2 * | 2/2010 | Seo ....................... G02B 15/142 396/73 |
|---|---|---|
| 2008/0088942 A1 | 4/2008 | Seo |
| 2014/0111650 A1 | 4/2014 | Georgiev et al. |
| 2017/0285307 A1 | 10/2017 | Kamm et al. |
| 2018/0259788 A1 | 9/2018 | Wang et al. |
| 2020/0057313 A1 | 2/2020 | Lee et al. |

FOREIGN PATENT DOCUMENTS

| CN | 107238913 A | 10/2017 |
|---|---|---|
| CN | 206559544 U | 10/2017 |
| CN | 107888834 A | 4/2018 |
| CN | 108572431 A | 9/2018 |
| CN | 108924388 A | 11/2018 |
| CN | 110475053 A | 11/2019 |

(Continued)

OTHER PUBLICATIONS

Korean Office Action dated Jan. 20, 2021 in the corresponding Korean Patent Application No. 10-2020-0034078. (5 pages in English) (4 pages in Korean).

(Continued)

*Primary Examiner* — Robert E. Tallman
(74) *Attorney, Agent, or Firm* — NSIP Law

(57) ABSTRACT

A camera module includes: a first lens module having a first optical axis; a second lens module having a second optical axis; a first optical path converting member configured to convert a path of incident light to a first optical path connected to the first optical axis and a second optical path connected to the second optical axis; and a first driving device configured to drive the first optical path converting member such that one optical path among the first optical path and the second optical path is selected.

18 Claims, 15 Drawing Sheets

(56) References Cited

FOREIGN PATENT DOCUMENTS

| | | |
|---|---|---|
| CN | 111756969 A | 10/2020 |
| JP | 2000-75338 A | 3/2000 |
| JP | 2000-261723 A | 9/2000 |
| JP | 2014-179736 A | 9/2014 |
| JP | 2017-187771 A | 10/2017 |
| KR | 10-2008-0076353 A | 8/2008 |
| KR | 10-2015-0072439 A | 6/2015 |
| KR | 10-2015-0089675 A | 8/2015 |
| KR | 10-2019-0071569 A | 6/2019 |
| WO | WO 2014/062481 A1 | 4/2014 |

OTHER PUBLICATIONS

Chinese Office Action dated Oct. 9, 2022, in counterpart Chinese Patent Application No. 202110021411.9 (7 pages in English and 9 pages in Chinese).

* cited by examiner

CAMERA MODULE

CROSS-REFERENCE TO RELATED APPLICATIONS

This application claims the benefit under 35 USC § 119(a) of Korean Patent Application No. 10-2020-0034078 filed on Mar. 19, 2020 in the Korean Intellectual Property Office, the entire disclosure of which is incorporated herein by reference for all purposes.

BACKGROUND

1. Field

The following description relates to a camera module configured to enable various types of imaging.

2. Description of Related Art

Mobile terminals may include camera modules to perform functions such as photography, videography, and video calls. A camera module for a mobile terminal is manufactured to have a fairly small size due to the spatial limitations of mobile terminals. For example, it is difficult for the length or volume of the camera module to exceed the thickness of the mobile terminal. For this reason, it may be difficult for the camera module to have various functions. For example, it may be difficult for a camera module to be configured to enable all of long-distance imaging, near-field imaging, and fine proximity imaging.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a first lens module having a first optical axis; a second lens module having a second optical axis; a first optical path converting member configured to convert a path of incident light to a first optical path connected to the first optical axis and a second optical path connected to the second optical axis; and a first driving device configured to drive the first optical path converting member such that one optical path among the first optical path and the second optical path is selected.

The first lens module and the second lens module may be configured to have different optical characteristics.

A distance from a rearmost lens of the first lens module to a first image sensor of the first lens module may be greater than a distance from a rearmost lens of the second lens module to a second image sensor of the second lens module.

A focal length of the first lens module may be greater than a focal length of the second lens module.

A distance from the first optical path converting member to a first image sensor of the first lens module may be greater than a distance from the first optical path converting member to a second image sensor of the second lens module.

The camera module may further include a second driving device configured to drive the first lens module and the second lens module in a direction of the first optical axis and a direction of the second optical axis direction, respectively.

The camera module may further include a second optical path converting member configured to refract or reflect light reflected from an object to the first optical path converting member.

The camera module may further include a third driving device configured to drive the second optical path converting member in a direction intersecting an optical axis of the incident light.

The camera module may further include a third optical path converting member configured to reflect or refract light emitted from the first optical path converting member to the first lens module.

The camera module may further include a fourth optical path converting member configured to reflect or refract light emitted from the first optical path converting member to the second lens module.

The first optical axis and the second optical axis may be parallel to each other.

In another general aspect, a camera module includes: a first lens module having a first optical axis; a second lens module having a second optical axis intersecting the first optical axis; a first optical path converting member configured to convert a path of incident light to a first optical path connected to the first optical axis and a second optical path connected to the second optical axis; and a first driving device configured to drive the first optical path converting member such that one optical path among the first optical path and the second optical path is selected.

The first lens module and the second lens module may be configured to have different optical characteristics.

The camera module may further include a second optical path converting member configured to refract or reflect light reflected from an object to the first optical path converting member.

The camera module may further include a second driving device configured to drive the second optical path converting member in a direction intersecting an optical axis of the incident light.

An angle formed between the first optical axis and the second optical axis may be less than 90 degrees.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
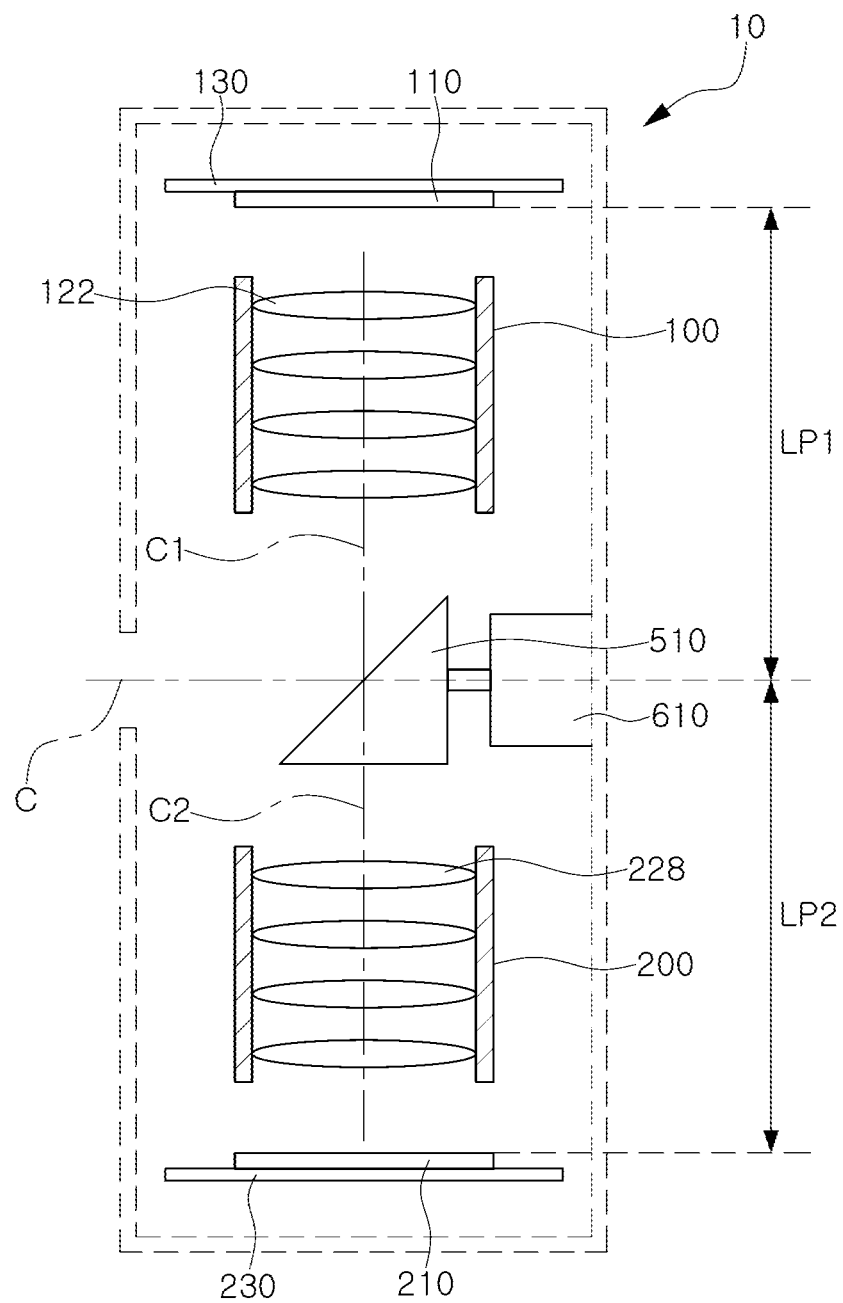
FIG. 1 is a configuration diagram of a camera module, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

A camera module, according to an example, may be mounted in a portable electronic product. For example, the camera module may be mounted on a mobile phone, laptop, or the like. However, the use range of a camera module according to the examples herein is not limited to the aforementioned electronic products. For example, the camera module may be installed in an Automatic Teller Machine (ATM), television for interactive broadcasting, drones, toys, and the like.

Figure 2A:
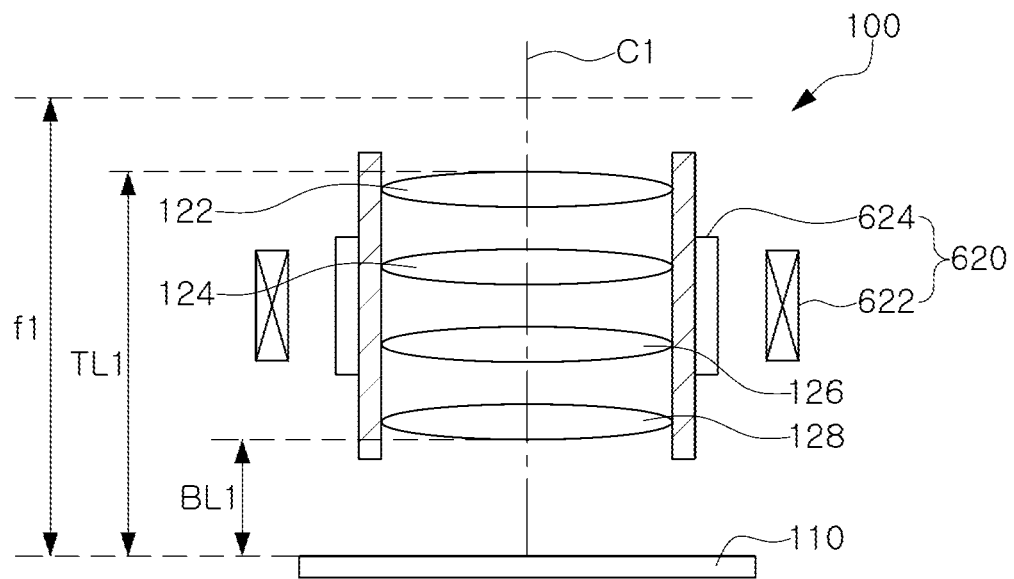
FIGS. 2A and 2B are configuration diagrams of lens modules illustrated in FIG. 1, according to examples.
Figure 2B:
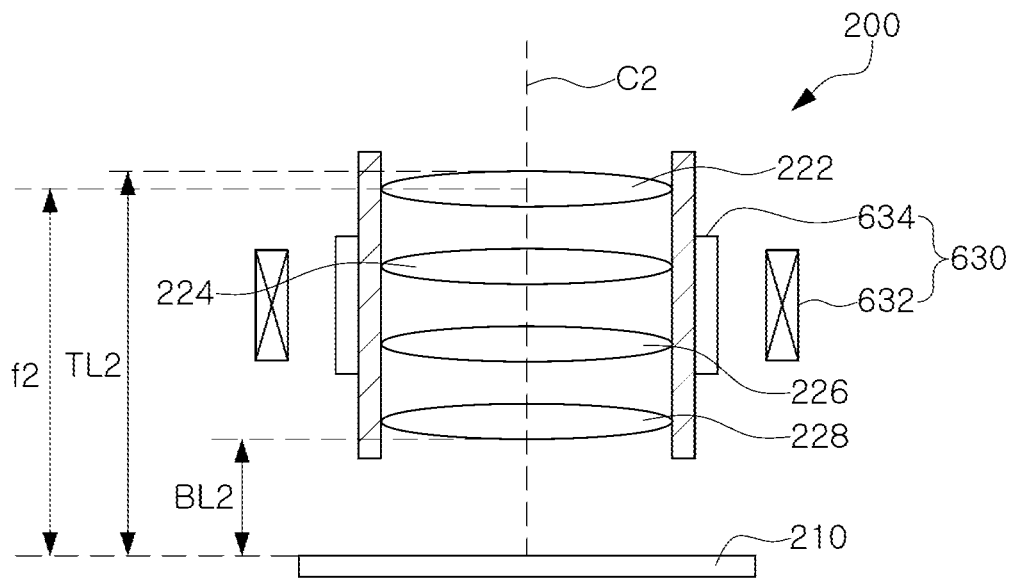
Figure 3:
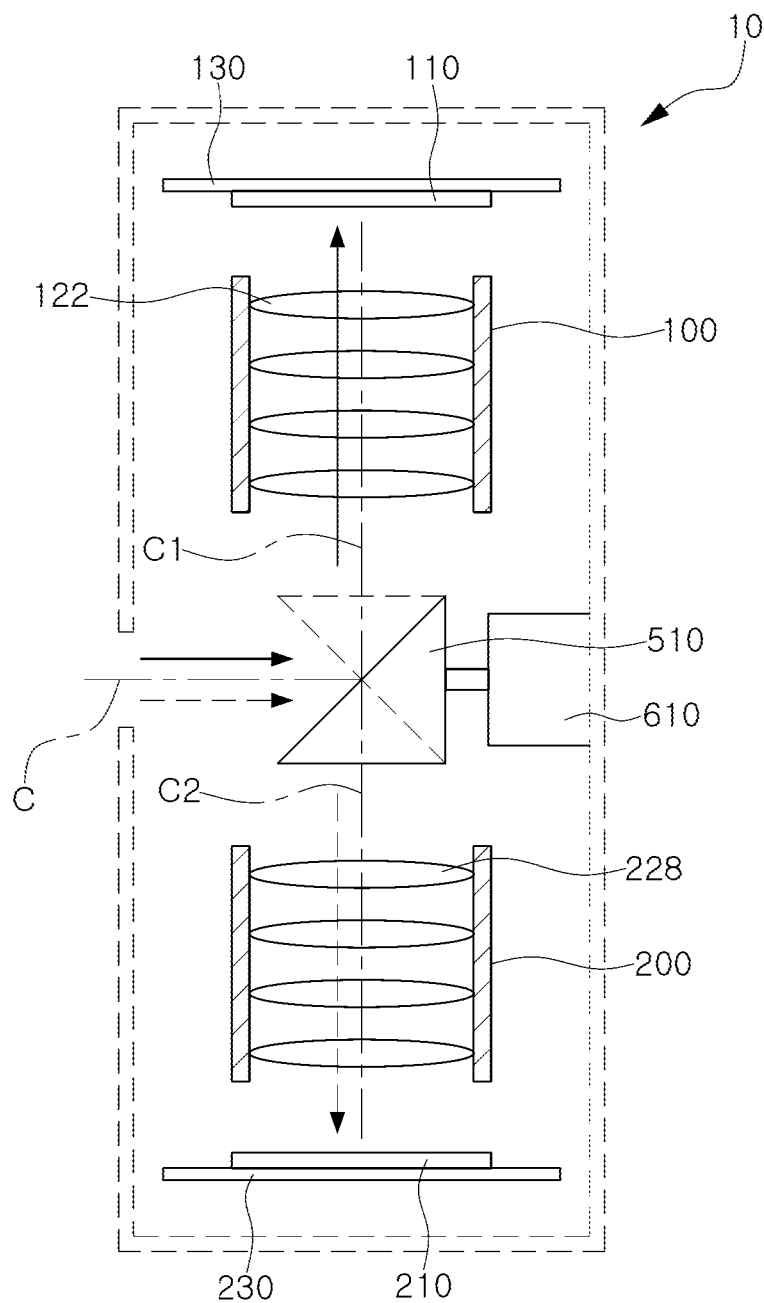
FIG. 3 is an operating state diagram of the camera module illustrated in FIG. 1, according to an example.

FIGS. 1 to 3 illustrate a camera module 10, according to an example.

Referring to FIGS. 1 to 3, the camera module 10 may include, for example, a first lens module 100, a second lens module 200, and a first optical path converting member 510. However, the configuration of the camera module 10 is not limited to the aforementioned members. For example, the camera module 10 may include a first image sensor 110, a second image sensor 210, a first circuit board 130, and a second circuit board 230.

The camera module 10 is configured to enable imaging using the first lens module 100 and the second lens module 200. For example, the camera module 10 may provide a first optical path connecting an optical axis C and a first optical axis C1 of the first lens module 100, and a second optical path connecting the optical axis C and a second optical axis C2 of the second lens module 200. That is, the first optical path may extend along the optical axis C and the first optical axis C1, and the second optical path may extend along the optical axis C and the second optical axis C2. The optical path of the camera module 10 may be changed by the first optical path converting member 510.

The first optical path converting member 510 may be configured to reflect or refract light incident on the camera module 10 to the first lens module 100 or the second lens module 200. For example, the first optical path converting member 510 may be in the form of a prism or a reflector configured to specularly reflect incident light at a predetermined angle. The first optical path converting member 510 may be disposed at a predetermined distance from the first image sensor 110 and the second image sensor 120. For example, a distance from a center of the first optical path converting member 510 to the first image sensor 110 is Lp1, and a distance from the center of the first optical path converting member 510 to the second image sensor 210 is Lp2. In this example, Lp1 and Lp2 may be the same distance, or Lp1 may be greater than Lp2.

The camera module 10 may include a first driving device 610 configured to drive the first optical path converting member 510. The first driving device 610 may rotate the first optical path converting member 510 to change a path of incident light to an optical path formed by the first optical path converting member 510. For example, the first driving device 610 may rotate the first optical path converting member 510 with respect to the optical axis C. That is the first driving device 610 may rotate the first optical path converting member 510 around an axis perpendicular to the optical axis C.

The camera module 10 may be configured to exhibit a plurality of optical characteristics. For example, the first lens module 100 and the second lens module 200 may be configured to exhibit different optical characteristics. The first lens module 100 and the second lens module 200 will be described in more detail with reference to FIGS. 2A and 2B.

Referring to FIG. 2A, the first lens module 100 may include a plurality of lenses 122, 124, 126 and 128. For example, the first lens module 100 may include four lenses 122, 124, 126 and 128. However, the number of lenses included in the first lens module 100 is not limited to four. For example, the first lens module 100 may include three or fewer lenses. As another example, the first lens module 100 may include five or more lenses. The first lens module 100 may be configured to exhibit predetermined optical characteristics. For example, the first lens module 100 may have a first focal length f1, a first rear focal length (a distance BL1 from an image-side surface of the rearmost lens 128 to the first image sensor 110), and a first optical length (a distance TL1 from an object-side surface of the frontmost lens 122 to the first image sensor 110). The first lens module 100 may be configured to be specialized for long-distance imaging. For example, the first focal length f1 of the first lens module 100 may be equal to or greater than the first optical length TL1.

Referring to FIG. 2B, the second lens module 200 may include a plurality of lenses 222, 224, 226 and 228. For example, the second lens module 200 may include four lenses 222, 224, 226 and 228. However, the number of lenses included in the second lens module 200 is not limited to four. For example, the second lens module 200 may include three or fewer lenses. As another example, the second lens module 200 may include five or more lenses. The second lens module 200 may be configured to exhibit predetermined optical characteristics. For example, the second lens module 200 includes a second focal length f2, a second rear focal length (a distance BL2 from an image-side surface of the rearmost lens 228 to the second image sensor 210), and a second optical length (a distance TL2 from an object-side surface of the frontmost lens 222 to the second image sensor 210). The second lens module 200 may be configured to be specialized for near-field imaging. For example, the second focal length f2 of the second lens module 200 may be less than the second optical length TL2.

A predetermined relationship may be established between the first lens module 100 and the second lens module 200. For example, the first focal length f1 of the first lens module 100 may be greater than the second focal length f2 of the second lens module 200. As another example, the first rear focal length BL1 of the first lens module 100 may be greater than the second rear focal length BL2 of the second lens module 200. However, the first optical length TL1 of the first lens module 100 may be the same as the second optical length TL2 of the second lens module 200 to be advantageous for miniaturization of the camera module 10.

The camera module 10 may include second driving devices 620 and 630 configured to drive the first lens module 100 and the second lens module 200. For example, the second driving device 620 may be configured to drive the first lens module 100 and the second driving device 630 may be configured to drive the second lens module 200. The second driving devices 620 and 630 may be configured to adjust the focal lengths of the first lens module 100 and the second lens module 200. For example, the second driving device 620 may be configured to adjust the focal length of the first lens module 100, and the second driving device 630 may be configured to adjust the focal length of the second lens module 200. The second driving devices 620 and 630 may include driving coils 622 and 632, respectively, and driving magnets 624 and 634, respectively. However, the configuration of the second driving devices 620 and 630 is not limited to the driving coils 622 and 632 and the driving magnets 624 and 634. For example, the second driving devices 620 and 630 may alternatively include a piezoelectric element, a shape memory alloy, or the like. The driving coils 622 and 632 and the driving magnets 624 and 634 may be configured to drive the first lens module 100 and the second lens module 200 in the direction of the first optical axis C1 and in the direction of the second optical axis C2, respectively. For example, the driving coil 622 and the driving magnet 624 may generate driving force required to move the first lens module 100 in the direction of the first optical axis C1, and the driving coil 632 and the driving magnet 634 may generate driving force required to move the second lens module 200 in the direction of the second optical axis C2.

FIG. 3 illustrates an operating example of the camera module 10.

The camera module 10 may be configured to have two optical paths. For example, incident light incident through the opening of the camera module 10 may be projected onto the first image sensor 110 or the second image sensor 210 through the first optical path moving along the optical axis C and the first optical axis C1 of the first lens module 100 or the second optical path moving along the optical axis C and the second optical axis C2 of the second lens module 200. The optical path of the camera module 10 may be changed by the first optical path converting member 510. For example, the first optical path converting member 510 reflects or refracts the incident light to the first lens module 100 in a normal state (e.g., default state), but may reflect or refract the incident light to the second lens module 200 when receiving a separate control signal. The change in the direction of reflection or refraction by the first optical path converting member 510 may be performed by the first driving device 610. For example, the first driving device 610 rotates the first optical path converting member 510 with respect to the optical axis C (e.g., around an axis perpendicular to the optical axis C) according to the control signal, thereby changing the reflection or refraction direction by the first optical path converting member 510.

The camera module 10 may be configured to selectively use one of the first lens module 100 and the second lens module 200 according to the type of the object to be imaged and the distance to the object to be imaged. For example, when the distance to the object to be imaged is determined to be greater than or equal to a reference set value, the camera module 10 may control the first optical path converting member 510 and the first driving device 610 (for example, the first optical path may be selected), such that imaging is performed through the first lens module 100. As another example, when the distance to the object to be imaged is determined to be less than the reference set value, the camera module 10 may control the first optical path converting member 510 and the first driving device 610 (e.g., the second optical path may be selected), such that imaging may be performed through the second lens module 200.

The camera module 10 configured as described above may be perform both far-field and near-field imaging regardless of the distance to the object to be imaged.

Figure 4:
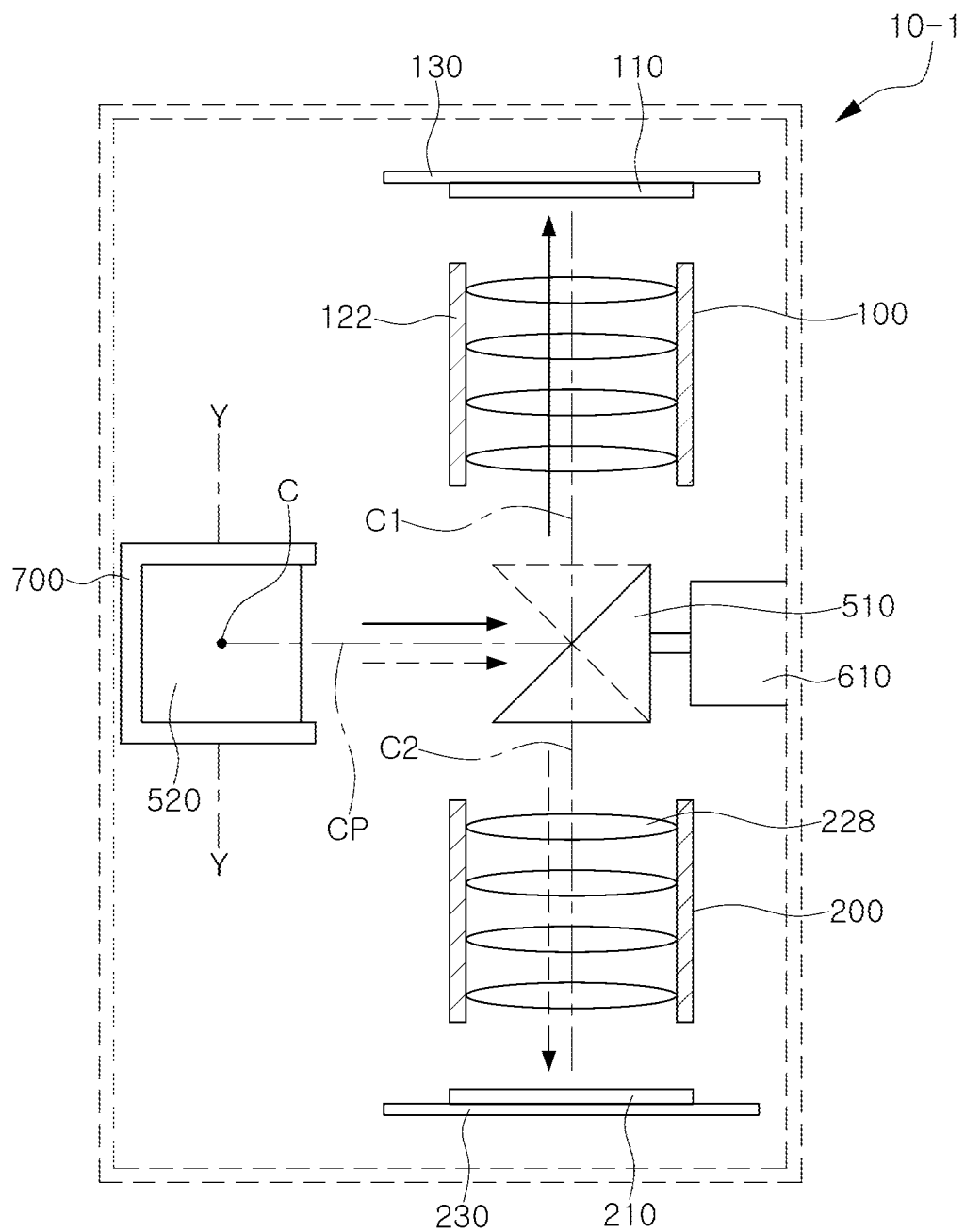
FIG. 4 is a configuration diagram of the camera module, according to an example.
Figure 5:
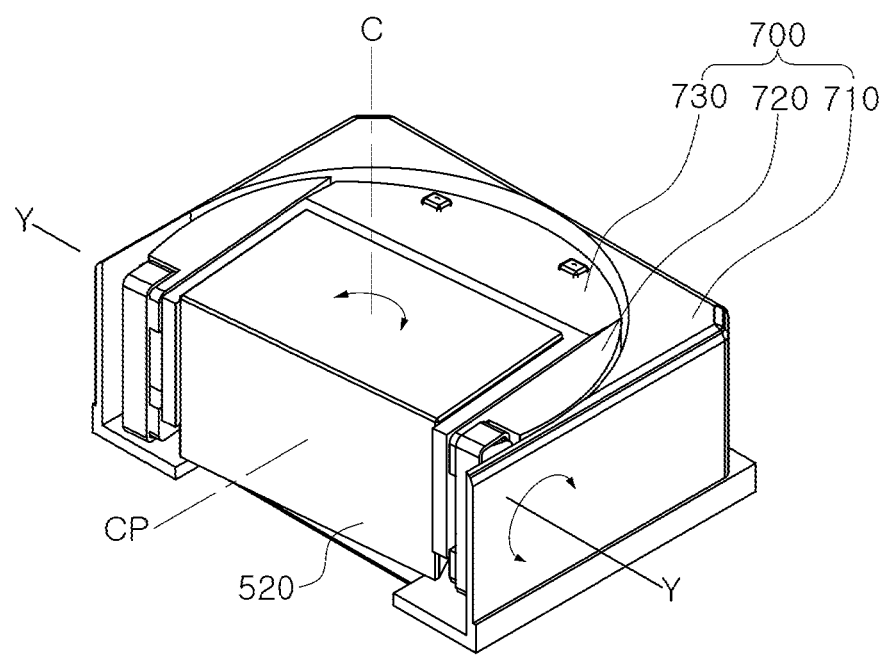
FIG. 5 is a configuration diagram of an image stabilization unit illustrated in FIG. 4, according to an example.

FIGS. 4 and 5 illustrate a camera module 10-1, according to an example. In addition to the components of the camera module 10, the camera module 10-1 may include a second optical path converting member 520 and a third driving device 700.

The second optical path converting member 520 is configured to reflect or refract light reflected from the object to the first optical path converting member 510. For example, the second optical path converting member 520 may convert the optical path of incident light so that an optical path connecting an optical axis C and an optical axis CP is formed. That is, second optical path converting member 520 may convert the optical path of incident light so that an optical path extending along the optical axis C and the optical axis CP is formed. The optical axis C may be formed to substantially intersect the optical axis CP, and the optical axis CP may be formed to intersect a first optical axis C1 and a second optical axis C2. The second optical path converting member 520 may be in the form of a prism or a reflector configured to specularly reflect incident light at a predetermined angle.

The third driving device 700 may include a first frame 710, a second frame 720, and a third frame 730, as illustrated in FIG. 5. The first frame 710 is fixed to the camera module 10-1. For example, the first frame 710 may be fixed to a member such as a housing of the camera module 10-1 or the like. The second frame 720 is disposed to be driven on the first frame 710. For example, the second frame 720 may be disposed on the first frame 710, to be rotatable around the optical axis C. The third frame 730 is disposed to be driven on the second frame 720. For example, the third frame 730 may be disposed on the second frame 720 to be rotatable about the axis (Y-Y). The third driving device 700 may be configured to drive the second optical path converting member 520 in a direction intersecting the optical axis C. For example, the third driving device 700 may rotate the second optical path converting member 520 about the optical axis C through the relative motion of the second frame 720 relative to the first frame 710. As another example, the third driving device 700 may be configured to rotate the second optical path converting member 520 about the axis Y-Y through the relative motion of the third frame 730 relative to the second frame 720. The camera shake correction function of the camera module 10-1 may be performed through driving of the second optical path converting member 520 configured as described above.

Therefore, in the case of the camera module 10-1, far-field and near-field imaging may be performed through a plurality of lens modules 100 and 200, and, furthermore, image stabilization may be obtained through the second optical path converting member 520 and the third driving device 700.

Figure 6:
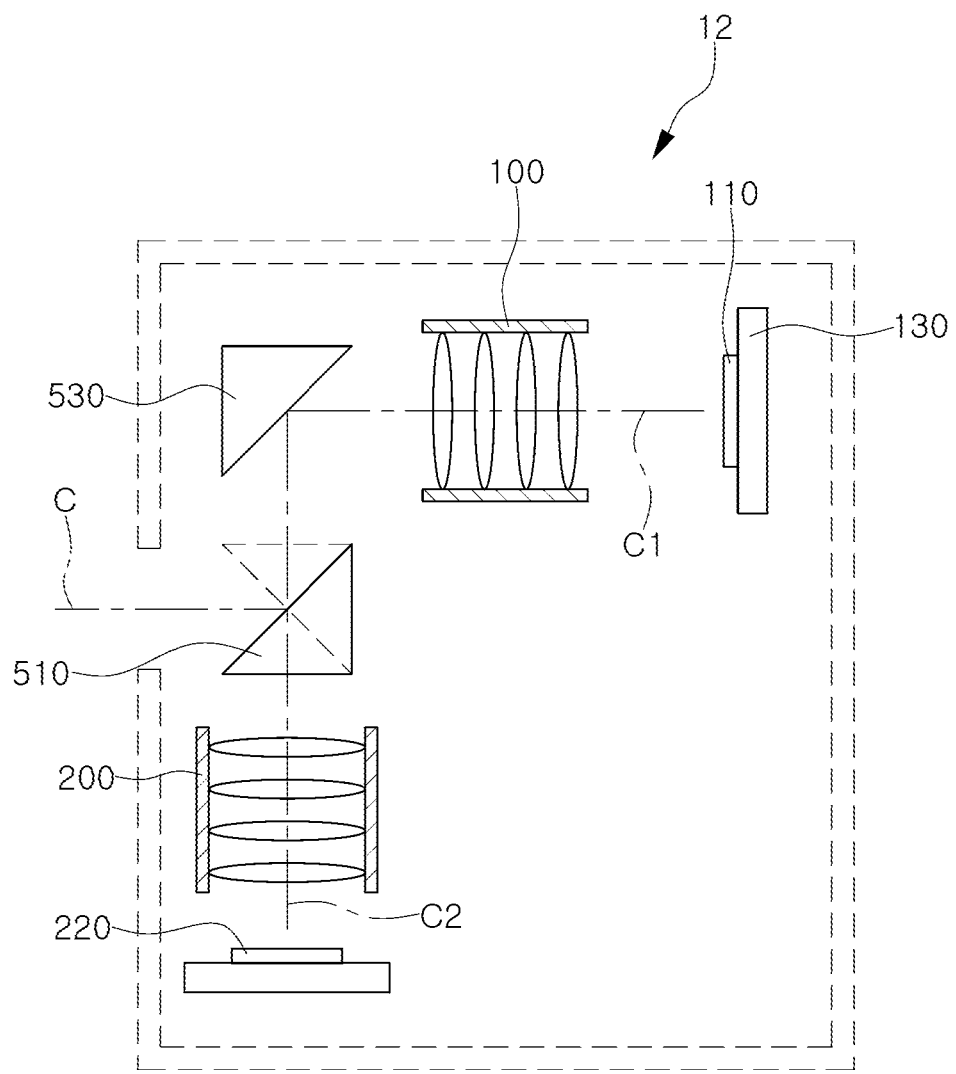
FIG. 6 is a configuration diagram of a camera module, according to an example.
Figure 7:
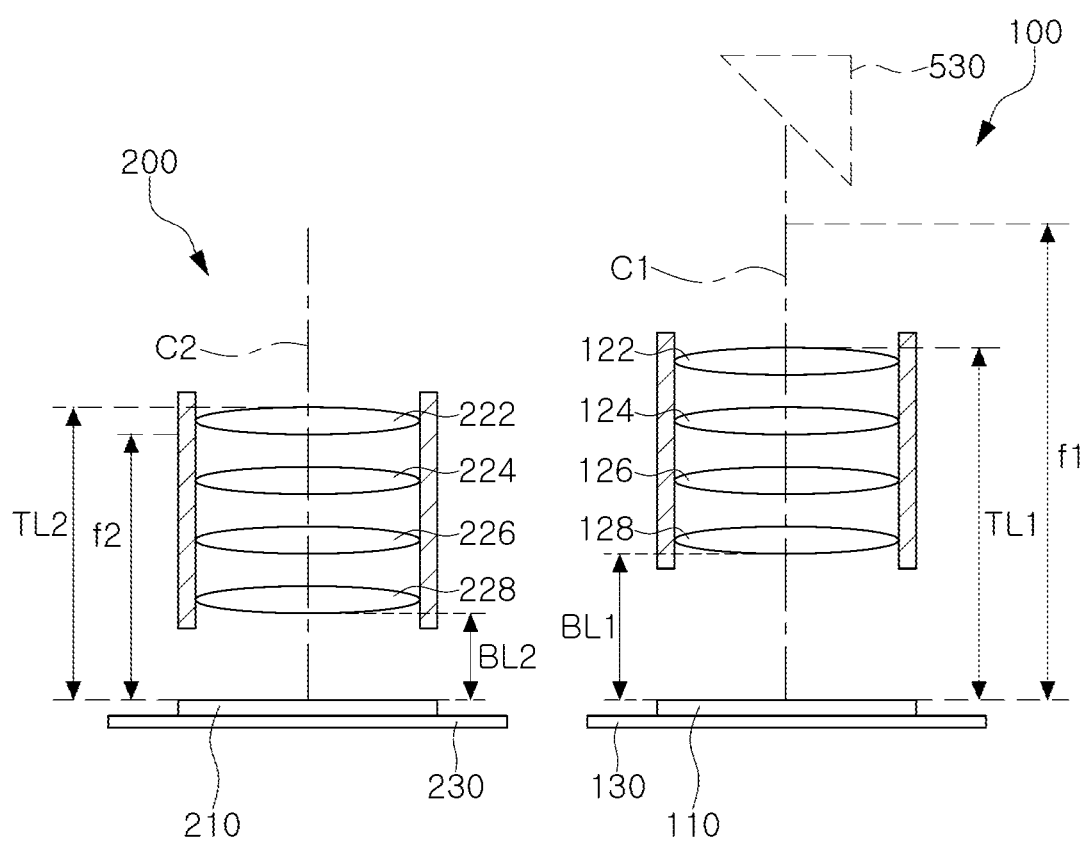
FIG. 7 is a configuration diagram of a lens module illustrated in FIG. 6, according to an example.

FIGS. 6 and 7 illustrate a camera module 12, according to an example.

The camera module 12 includes, for example, the first lens module 100, the second lens module 200, the first optical path converting member 510, and a third optical path converting member 530. However, the configuration of the camera module 12 is not limited to the aforementioned members. For example, the camera module 12 may include the first image sensor 110, the second image sensor 210, the first circuit board 130, and the second circuit board 230.

The camera module 12 is configured to enable imaging using the first lens module 100 and the second lens module 200. For example, the camera module 12 may provide a first optical path connecting an optical axis C and a first optical axis C1 of the first lens module 100, and a second optical path connecting the optical axis C and a second optical axis C2 of the second lens module 200. That is, the first optical path may extend along the optical axis C and the first optical axis C1, and the second optical path may extend along the optical axis C and the second optical axis C2. The optical path of the camera module 12 may be changed by the first optical path converting member 510.

The first optical path converting member 510 may be configured to reflect or refract light incident on the camera module 12 to the third optical path converting member 530 or the second lens module 200. The first optical path converting member 510 may be in the form of a prism or a reflector that may specularly reflect incident light at a predetermined angle.

The third optical path converting member 530 may be configured to reflect or refract light emitted from the first optical path converting member 510 to the first lens module 100. The third optical path converting member 530 may be in the form of a prism or a reflector that may specularly reflect the incident light at a predetermined angle.

The camera module 12 may include the first driving device 610 configured to drive the first optical path converting member 510. The first driving device 610 may rotate the first optical path converting member 510 to change a path of incident light to an optical path formed by the first optical path converting member 510. For example, the first driving device 610 may rotate the first optical path converting member 510 with respect to the optical axis C (e.g., about an axis perpendicular to the optical axis C.

The camera module 12 may be configured to exhibit a plurality of optical characteristics. For example, the first lens module 100 and the second lens module 200 may be configured to exhibit different optical characteristics. The first lens module 100 and the second lens module 200 will be described in more detail with reference to FIG. 7.

Referring to FIG. 7, the first lens module 100 may include the plurality of lenses 122, 124, 126 and 128. For example, the first lens module 100 may include the four lenses 122, 124, 126 and 128. However, the number of lenses included in the first lens module 100 is not limited to four. For example, the first lens module 100 may include three or fewer lenses. As another example, the first lens module 100 may include five or more lenses. The first lens module 100 may be configured to exhibit predetermined optical characteristics. For example, the first lens module 100 may have a first focal length f1, a first rear focal length (a distance BL1 from the image-side surface of the rearmost lens 128 to the first image sensor 110), and a first optical length (a distance TL1 from the object-side surface of the frontmost lens 122 to the first image sensor 110). The first lens module 100 may be configured to be specialized for far field imaging. For example, a first focal length f1 of the first lens module 100 may be equal to or may be greater than the first optical length TL1. The first focal length f1 of the first lens module 100 may have a considerable size. For example, the first focal length f1 may have a size corresponding to a distance from the first image sensor 110 to the third optical path converting member 530.

The second lens module 200 may include the plurality of lenses 222, 224, 226 and 228. For example, the second lens module 200 may include the four lenses 222, 224, 226 and 228. However, the number of lenses included in the second lens module 200 is not limited to four. For example, the second lens module 200 may include three or fewer lenses. As another example, the second lens module 200 may include five or more lenses. The second lens module 200 may be configured to exhibit predetermined optical characteristics. For example, the second lens module 200 may have a second focal length f2, a second rear focal length (a distance BL2 from the image-side surface of the rearmost lens 228 to the second image sensor 210), a second optical length (a distance TL2 from the object-side surface of the frontmost lens 222 to the second image sensor 210. The second lens module 200 may be configured to be specialized for near-field imaging. For example, the second focal length f2 of the second lens module 200 may be less than the second optical length TL2.

A predetermined relationship may be established between the first lens module 100 and the second lens module 200. For example, the first focal length f1 of the first lens module 100 may be greater than the second focal length f2 of the second lens module 200. As another example, the first rear focal length BL1 of the first lens module 100 may be greater than the second rear focal length BL2 of the second lens module 200. However, the first optical length TL1 of the first lens module 100 may have the same size as the second optical length TL2 of the second lens module 200 to be advantageous for miniaturization of the camera module 12.

An operating example of the camera module 12 will be described with reference to FIG. 8.

Figure 8:
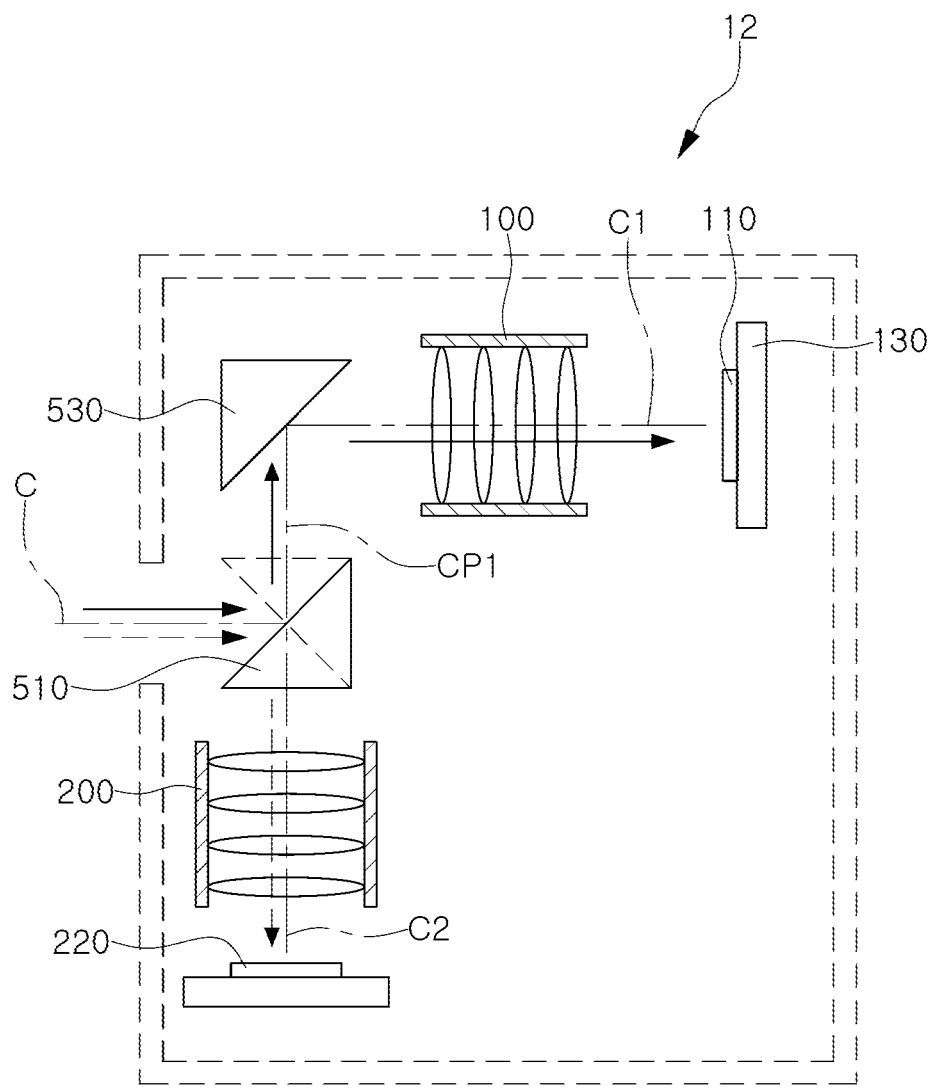
FIG. 8 is an operational state diagram of the camera module illustrated in FIG. 6.

Referring to FIG. 8, camera module 12 may be configured to have two optical paths. For example, incident light incident through the opening of the camera module 12 may be projected onto the first image sensor 110 or the second image sensor 210 through a first optical path moving along the optical axis C, an optical axis CP1 and the first optical axis C1, or through a second optical path moving along the optical axis C and the second optical axis C2 of the lens module 200. The optical path of the camera module 12 may be changed by the first optical path converting member 510. For example, the first optical path converting member 510 reflects or refracts incident light to the third optical path converting member 530 in the normal state (e.g., default state), but may reflect or refract the incident light to the second lens module 200 upon receiving a separate control signal. The change in a reflection or refraction direction by the first optical path converting member 510 may be performed by a separate driving unit. The optical path of the camera module 12 may be changed depending on the distance to the object to be imaged. For example, the camera module 12 may operate such that incident light is projected to the first optical path when imaging an object located at a long distance. As another example, the camera module 12 may operate such that incident light is projected to the second optical path when imaging an object located at a short distance.

In the case of the camera module 12 configured as described above, both long-distance and short-distance imaging may be performed regardless of the distance to the imaging object. In addition, since the first lens module 100 of the camera module 12 according to this example may implement a first focal length f1 having a fairly large size, imaging an object or a landscape located at a very long distance may be performed.

Figure 9:
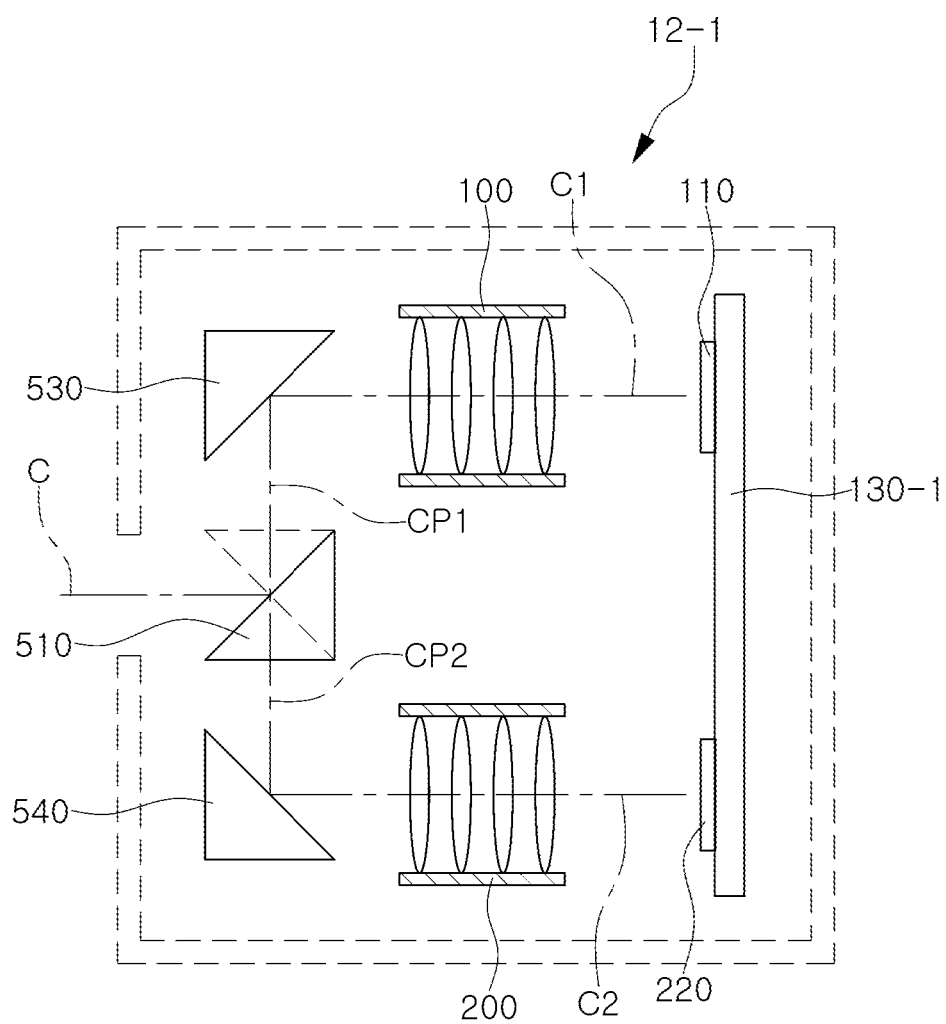
FIG. 9 is a configuration diagram of a camera module, according to an example.

FIG. 9 illustrates a camera module 12-1, according to an example.

Referring to FIG. 9, in addition to the components of the camera module 12, the camera module 12-1 may include a fourth optical path converting member 540. The fourth optical path converting member 540 is configured to project light emitted from the first optical path converting member 510 to the second lens module 200. The fourth optical path converting member 540 may be in the form of a prism or a reflector configured to specularly reflect incident light at a predetermined angle.

The camera module 12-1 may provide two optical paths. One optical path is a first optical path passing through the optical axis C, the optical axis CP1, and the first optical axis C1, and the other optical path is a second optical path passing through the optical axis C, an optical axis CP2, and the second optical axis C2. In the camera module 12-1, the first optical axis C1 and the second optical axis C2 may be formed substantially parallel to each other. In addition, the camera module 12-1 may be configured such that the first image sensor 110 and the second image sensor 210 are disposed on a single substrate 130-1. However, the first image sensor 110 and the second image sensor 210 are not necessarily disposed on the single substrate 130-1. For example, the first image sensor 110 and the second image sensor 210 may also be disposed on different substrates as needed.

Since, in the camera module 12-1, the first lens module 100 and the second lens module 200 may be disposed to be parallel to each other, the size of the camera module 12 in the width direction (the CP1 and CP2 direction) may be reduced. In addition, since, in the camera module 12-1, the first image sensor 110 and the second image sensor 210 may be disposed on one substrate 130-1 as described above, an assembly process of the camera module 12-1 may simplified.

Figure 10:
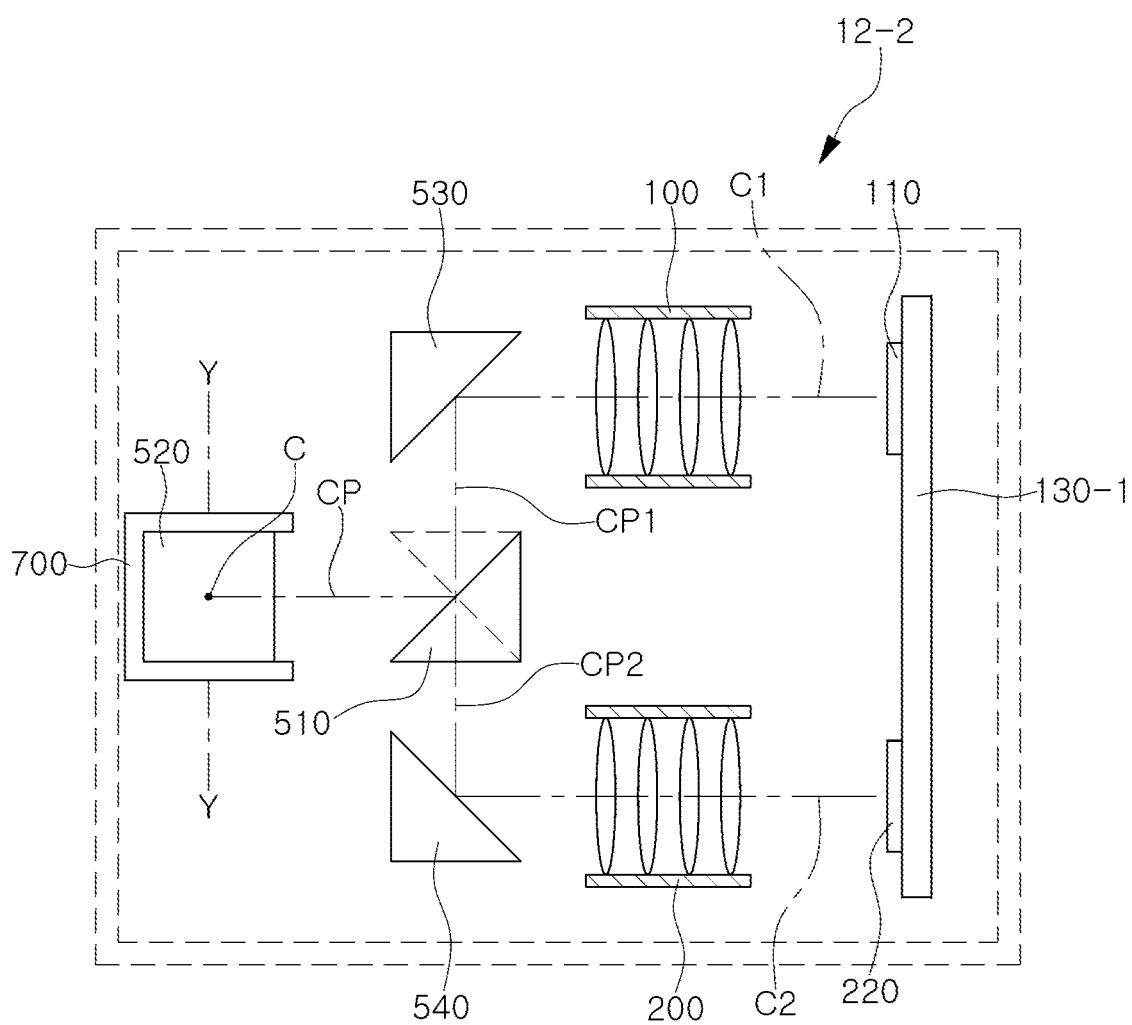
FIG. 10 is a configuration diagram of a camera module, according to an example.

FIG. 10 illustrates camera module 12-2, according to an embodiment.

Referring to FIG. 10, in addition to the components of the camera module 12, the camera module 12-2 may include the second optical path converting member 520, the fourth optical path converting member 540, and the third driving device 700.

The second optical path converting member 520 is configured to reflect or refract light reflected from the object to the first optical path converting member 510. For example, the second optical path converting member 520 may convert the optical path of incident light so that an optical path connecting the optical axis C and the optical axis CP is formed. The optical axis C may be formed to substantially intersect the optical axis CP, and the optical axis CP may be formed to be parallel to the first optical axis C1 and the second optical axis C2. The second optical path converting member 520 may be in the form of a prism or a reflector configured to specularly reflect incident light at a predetermined angle.

The third driving device 700 may have a configuration substantially the same as the configuration according to the above-described example. For example, the third driving device 700 may include the first frame 710, the second frame 720, and the third frame 730 as illustrated in FIG. 5, and may rotate the second optical path converting member 520 around the optical axis C and the axis Y-Y, through driving of the second frame 720 and the third frame 730.

The fourth optical path converting member 540 is configured to project light emitted from the first optical path converting member 510 to the second lens module 200. The fourth optical path converting unit 540 may be in the form of a prism or a reflector capable of specularly reflecting incident light at a predetermined angle.

The camera module 12-1 not only enables far-field and near-field imaging through a plurality of lens modules 100 and 200, but also obtains image stabilization through the second optical path converting member 520 and the third driving device 700.

Figure 11:
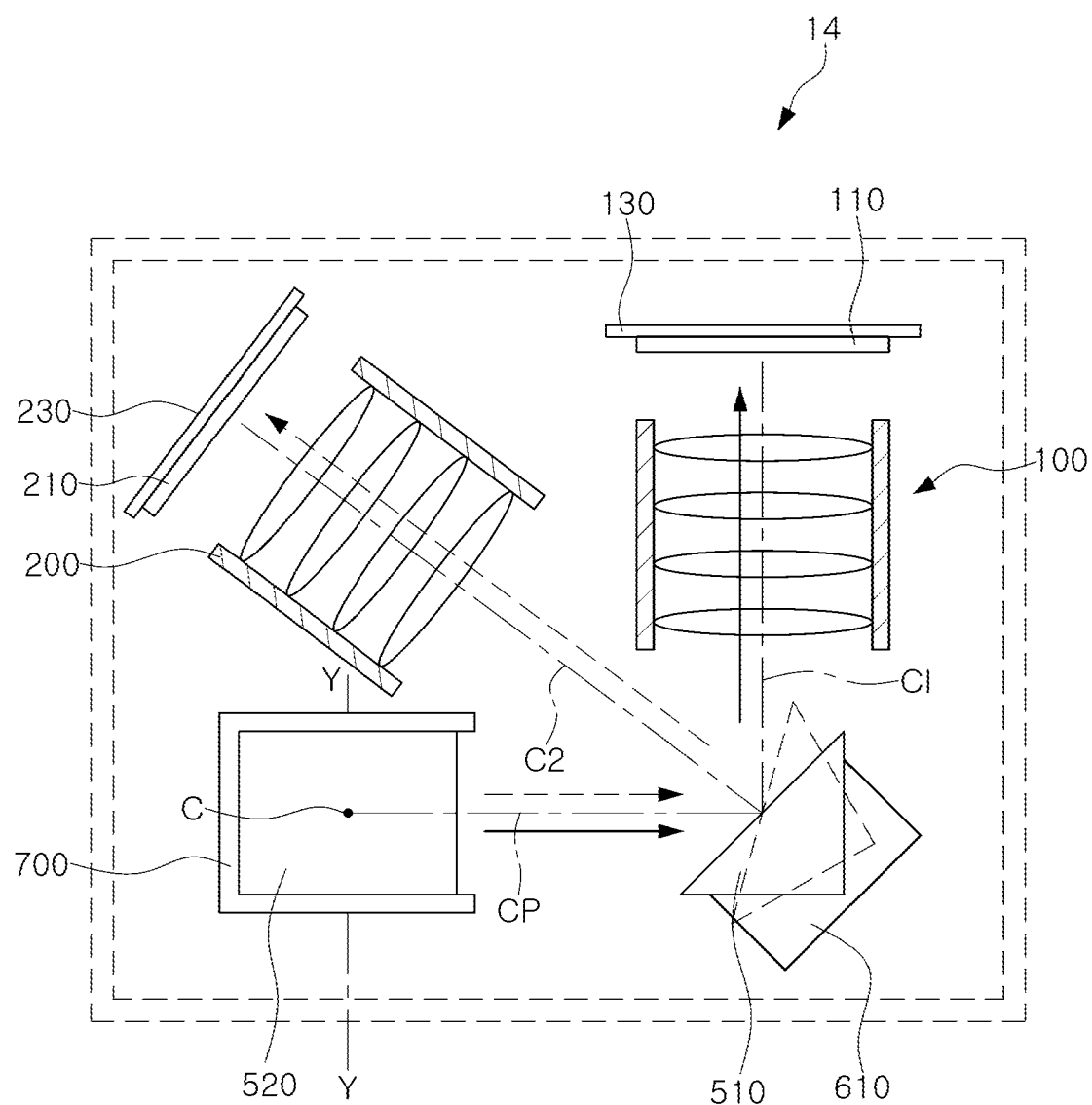
FIG. 11 is a configuration diagram of a camera module, according to an example.
Figure 12:
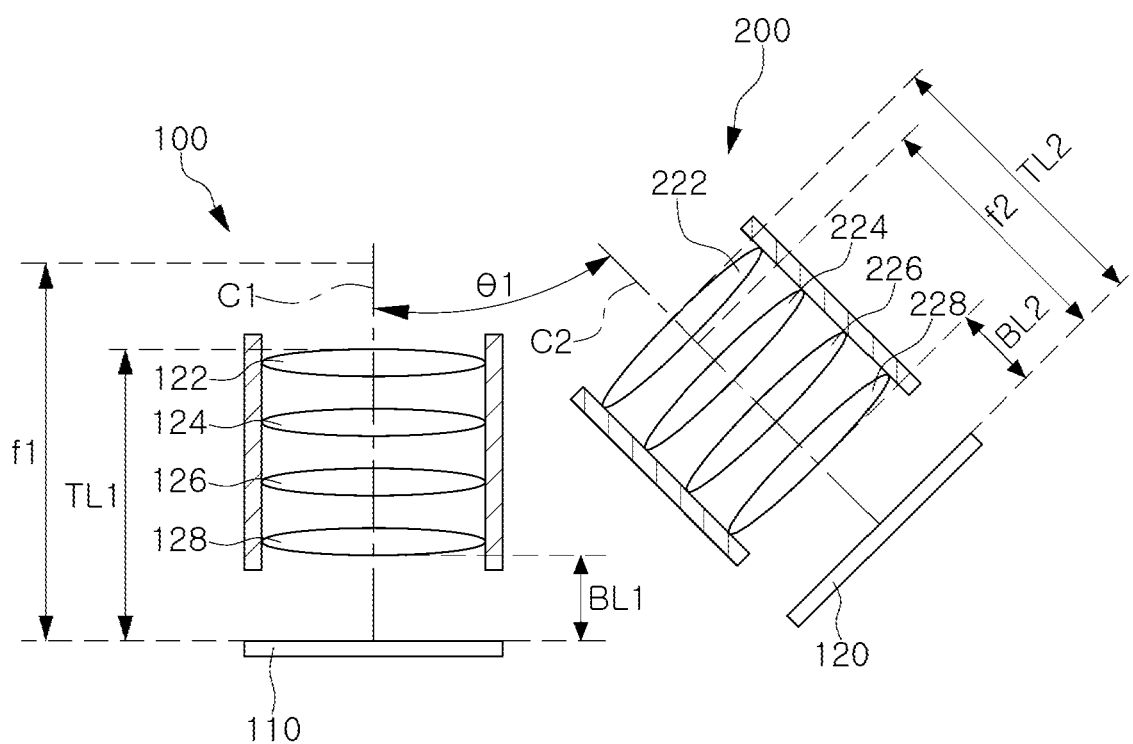
FIG. 12 is a configuration diagram of a lens module illustrated in FIG. 11.

FIGS. 11 and 12 illustrate a camera module 14, according to an example.

Referring to FIGS. 11 and 12, the camera module 14 includes the first lens module 100, the second lens module 200, the first optical path converting member 510, the second optical path converting member 520, the first driving device 610, and the third driving device 700. However, the configuration of the camera module 14 is not limited to the aforementioned members. For example, the camera module 14 may include the first image sensor 110, the second image sensor 210, the first circuit board 130, and the second circuit board 230.

The camera module 14 is configured to enable imaging using the first lens module 100 and the second lens module 200. For example, the camera module 14 may provide a first optical path connecting the optical axis C, the optical axis CP and the first optical axis C1, and a second optical path connecting the optical axis C, the optical axis CP and the second optical axis C2. The optical path of the camera module 14 may be changed by the first optical path converting member 510.

The first optical path converting member 510 may be configured to reflect or refract light emitted from the second optical path converting member 520 to the first lens module 100 or the second lens module 200. The first optical path converting member 510 may be in the form of a prism or a reflector that may specularly reflect incident light at a predetermined angle.

The second optical path converting member 520 may be configured to reflect or refract light incident on the camera module 14 to the first optical path converting member 510. The second optical path converting member 520 may be in the form of a prism or a reflector configured to specularly reflect incident light at a predetermined angle.

The camera module 14 may include the first driving device 610 configured to drive the first optical path converting member 510. The first driving device 610 may rotate the first optical path converting member 510 to change a path of incident light to an optical path formed by the first optical path converting member 510. For example, the first driving device 610 may rotate the first optical path converting member 510 around the intersection of the optical axis CP and the first optical axis C1.

The third driving device 700 may have a configuration substantially the same as the configuration according to the above-described example. For example, the third driving device 700 may include the first frame 710, the second frame 720, and the third frame 730 as illustrated in FIG. 5, and may rotate the second optical path converting member 520 around the optical axis C and the axis Y-Y through driving of the second frame 720 and the third frame 730.

The camera module 14 may be configured to exhibit a plurality of optical characteristics. For example, the first lens module 100 and the second lens module 200 may be configured to exhibit different optical characteristics. The first lens module 100 and the second lens module 200 will be described in more detail with reference to FIG. 12.

Referring to FIG. 12, the first lens module 100 may include the plurality of lenses 122, 124, 126 and 128. For example, the first lens module 100 may include the four lenses 122, 124, 126 and 128. However, the number of lenses included in the first lens module 100 is not limited to four. For example, the first lens module 100 may include three or fewer lenses. As another example, the first lens module 100 may include five or more lenses. The first lens module 100 may be configured to exhibit predetermined optical characteristics. For example, the first lens module 100 may have a first focal length f1, a first rear focal length (a distance BL1 from the image-side surface of the rearmost lens 128 to the first image sensor 110, a first optical length (a distance TL1 from the object-side surface of the frontmost lens 122 to the first image sensor 110. The first lens module 100 may be configured to be specialized for far-field imaging. For example, the first focal length f1 of the first lens module 100 may be equal to or may be greater than the first optical length TL1.

The second lens module 200 may include the plurality of lenses 222, 224, 226 and 228. For example, the second lens module 200 may include the four lenses 222, 224, 226 and 228. However, the number of lenses included in the second lens module 200 is not limited to four. For example, the second lens module 200 may include three or fewer lenses. As another example, the second lens module 200 may include five or more lenses. The second lens module 200 may be configured to exhibit predetermined optical characteristics. For example, the second lens module 200 may have a second focal length f2, a second rear focal length (a distance BL2 from the image-side surface of the rearmost lens 228 to the second image sensor 210), and a second optical length (a distance TL2 from the object-side surface of the frontmost lens 222 to the second image sensor 210. The second lens module 200 may be configured to be specialized for near-field imaging. For example, the second focal length f2 of the second lens module 200 may be less than the second optical length TL2.

A predetermined relationship may be established between the first lens module 100 and the second lens module 200. For example, the first focal length f1 of the first lens module 100 may be greater than the second focal length f2 of the second lens module 200. As another example, the first rear focal length BL1 of the first lens module 100 may be greater than the second rear focal length BL2 of the second lens module 200. However, the first optical length TL1 of the first lens module 100 may have the same size as the second optical length TL2 of the second lens module 200 to be advantageous for miniaturization of the camera module 10.

The first optical axis C1 of the first lens module 100 may be configured to intersect the second optical axis C2 of the second lens module 200. For example, the first optical axis C1 and the second optical axis C2 may be configured to form a first angle θ1 therebetween. The first angle θ1 may be less than 90 degrees. For example, the first angle θ1 may be 45 degrees. However, the size of the first angle θ1 is not limited to 45 degrees.

An operating example of the camera module 14 will be described with reference to FIG. 13.

Figure 13:
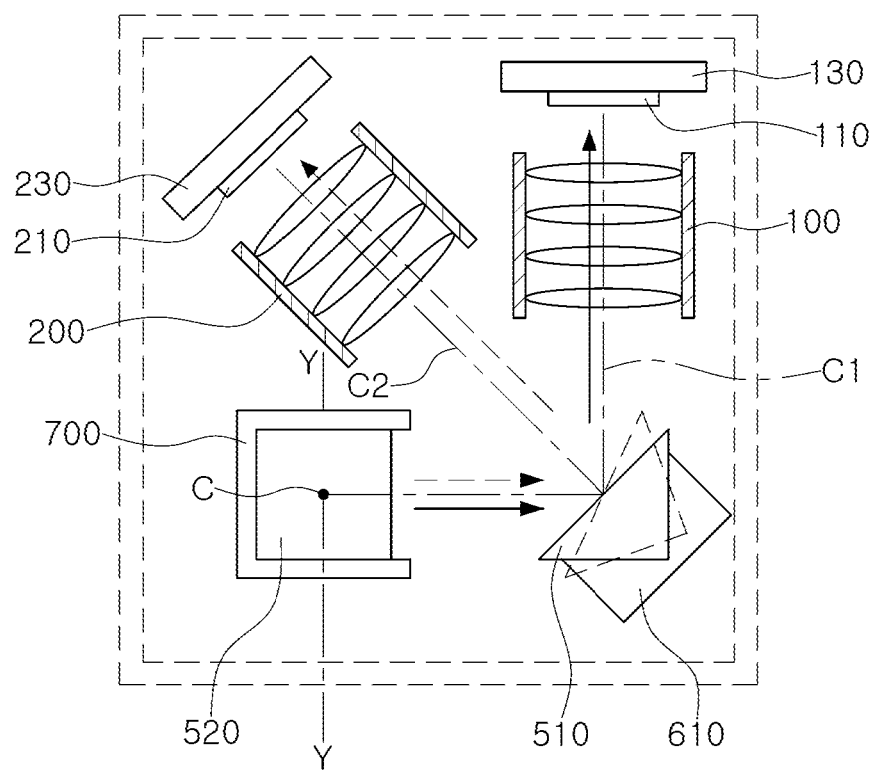
FIG. 13 is an operating state diagram of the camera module illustrated in FIG. 11 according to an example.

Referring to FIG. 13, the camera module 14 may be configured to have two optical paths. For example, incident light incident through the opening of the camera module 14 may be projected onto the first image sensor 110 or the second image sensor 210 through the first optical path moving along the optical axis C, the optical axis CP, and the first optical axis C1 or through the second optical path moving along the optical axis C, the optical axis CP and the second optical axis C2 of the second lens module 200. The optical path of the camera module 14 may be changed by the first optical path converting member 510. For example, the first optical path converting member 510 may reflect or refract the incident light to the first lens module 100 in the normal state (e.g., default state), but may reflect or refract the incident light to the second lens module 200 when receiving a separate control signal. The change in the direction of reflection or refraction by the first optical path converting member 510 may be performed by the first driving device 610. The optical path of the camera module 14 may be changed depending on the distance to the object to be imaged. For example, the camera module 14 may operate such that incident light is projected to the first optical path when imaging an object located at a long distance. As another example, the camera module 14 may operate such that incident light is projected to the second optical path when imaging an object located at a short distance.

In the case of the camera module 14 configured as described above, both far-field and near-field imaging may be performed regardless of the distance to the imaging object. In addition, in the case of the camera module 14, the first lens module 100 and the second lens module 200 may be integrated in a limited space, which may be advantageous for miniaturization of the camera module 14.

Figure 14:
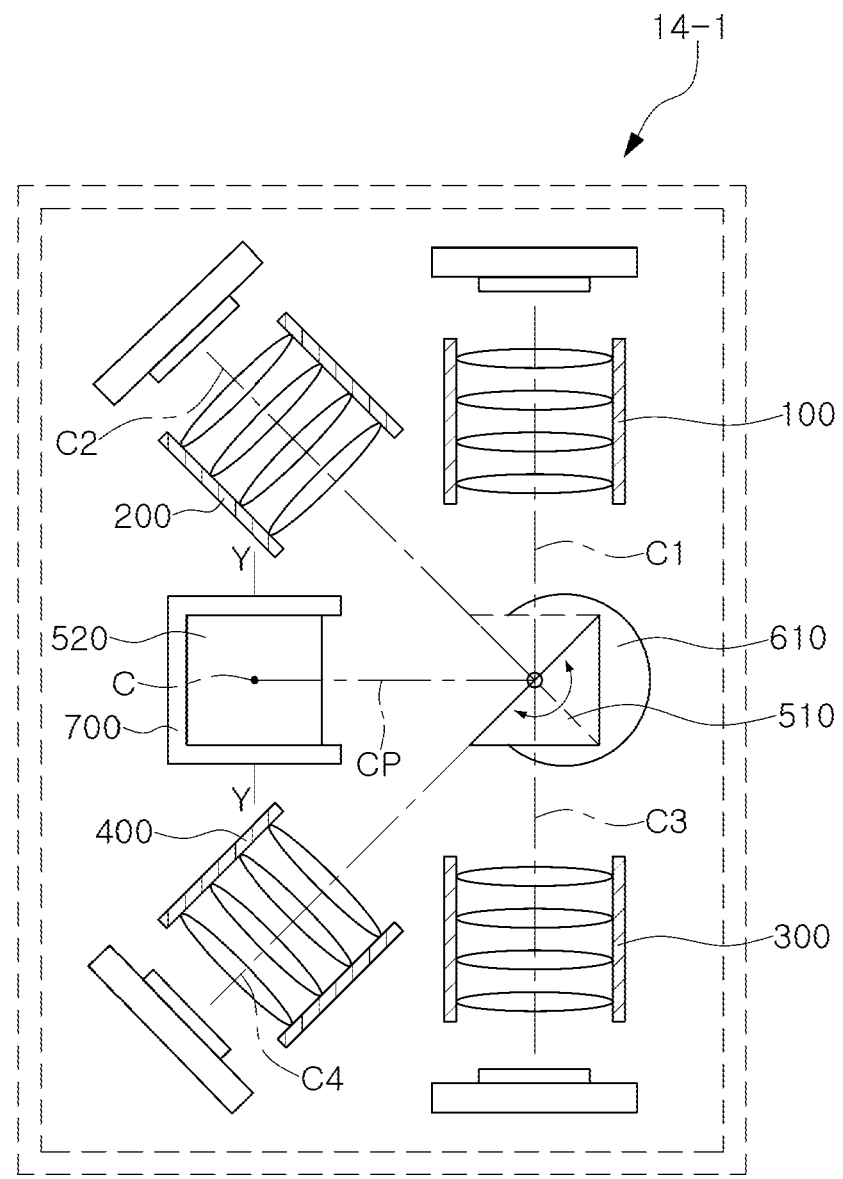
FIG. 14 is a configuration diagram of a camera module, according to an example.
Figure 15:
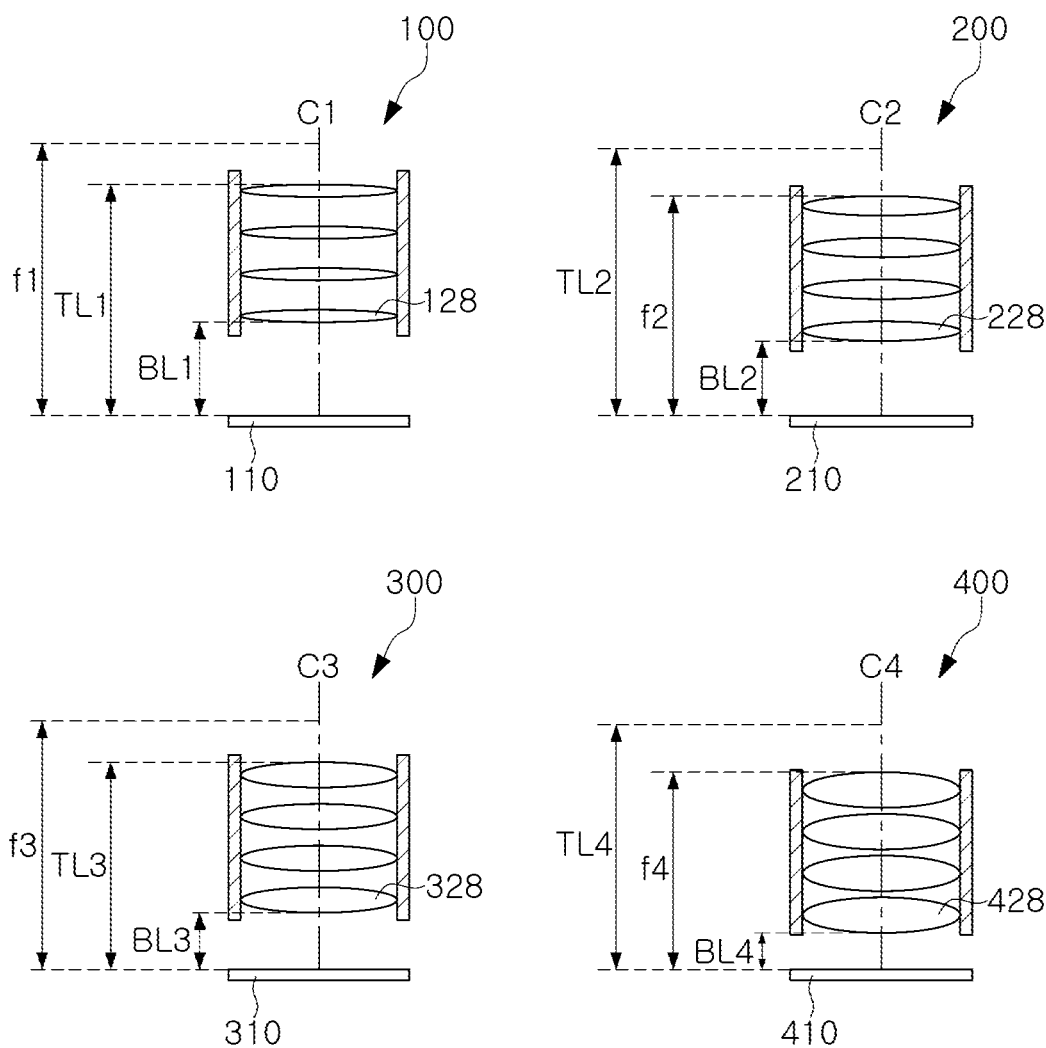
FIG. 15 is a configuration diagram of a lens module illustrated in FIG. 14.

FIGS. 14 and 15 illustrate a camera module 14-1, according to an example.

Referring to FIGS. 14 and 15, in addition to the elements of the camera module 14, the camera module 14-1 may include a third lens module 300 and a fourth lens module 400.

The camera module 14 may be configured to enable imaging through the first lens module 100, the second lens module 200, the third lens module 300, and the fourth lens module 400. For example, the camera module 14 may project light incident on the second optical path converting member 520 to the first lens module 100 to form an image on the first image sensor 110. As another example, the camera module 14 may project light incident on the second optical path converting member 520 to the second lens module 200 to form an image on the second image sensor 210. As another example, the camera module 14 may project light incident on the second optical path converting member 520 to the third lens module 300 to form an image on the third image sensor 310. As another example, the camera module 14 may project light incident on the second optical path converting member 520 to the fourth lens module 400 to form an image on the fourth image sensor 410. The optical path, which is connected from the second optical path converting member 520 to one of the first to fourth lens modules 100 to 400, may be changed by the first optical path converting member 510. For example, the first optical path converting member 510 may adjust the optical path by changing the facing angle of the first optical path converting member 510 with respect to the second optical path converting member 520. The facing angle of the first optical path converting member 510 with respect to the second optical path converting member 520 may be obtained through the first driving device 610.

The lens modules 100, 200, 300 and 400 may be configured to enable near and far-field imaging. For example, the first lens module 100 and the third lens module 200 may be configured to image an object located at a long distance, and the second lens module 200 and the fourth lens module 400 may be configured to image an object located at a short distance.

The lens modules 100, 200, 300 and 400 may be configured to have different optical characteristics. For example, the focal lengths f1, f2, f3 and f4 of the first lens module 100 to the fourth lens module 400 may all be different. As another example, the optical lengths TL1, TL2, TL3 and TL4 of the first lens module 100 to the fourth lens module 400 may all be different. As another example, the rear focal lengths BL1, BL2, BL3 and Bl4 of the first lens module 100 to the fourth lens module 400 may all be different.

In the case of the camera module 14-1, since imaging may be performed through a plurality of lens modules 100, 200, 300 and 400, customized imaging suitable for the size, position or distance of the object to be imaged, the ambient brightness of the object to be imaged, and the like, may be performed.

As set forth above, according to examples disclosed herein, a camera module may have a plurality of imaging functions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
 a first lens module having a first optical axis;
 a second lens module having a second optical axis;
 a first optical path converting member configured to convert a path of incident light to a first optical path connected to the first optical axis and a second optical path connected to the second optical axis; and
 a first driving device configured to drive the first optical path converting member such that one optical path among the first optical path and the second optical path is selected.

2. The camera module of claim 1, wherein the first lens module and the second lens module are configured to have different optical characteristics.

3. The camera module of claim 1, wherein a distance from a rearmost lens of the first lens module to a first image sensor of the first lens module is greater than a distance from a rearmost lens of the second lens module to a second image sensor of the second lens module.

4. The camera module of claim 1, wherein a focal length of the first lens module is greater than a focal length of the second lens module.

5. The camera module of claim 1, wherein a distance from the first optical path converting member to a first image sensor of the first lens module is greater than a distance from the first optical path converting member to a second image sensor of the second lens module.

6. The camera module of claim 1, further comprising a second driving device configured to drive the first lens module and the second lens module in a direction of the first optical axis and a direction of the second optical axis direction, respectively.

7. The camera module of claim 1, further comprising a second optical path converting member configured to refract or reflect light reflected from an object to the first optical path converting member.

8. The camera module of claim 7, further comprising a third driving device configured to drive the second optical path converting member in a direction intersecting an optical axis of the incident light.

9. The camera module of claim 1, further comprising a third optical path converting member configured to reflect or refract light emitted from the first optical path converting member to the first lens module.

10. The camera module of claim 9, further comprising a fourth optical path converting member configured to reflect or refract light emitted from the first optical path converting member to the second lens module.

11. The camera module of claim 10, wherein the first optical axis and the second optical axis are parallel to each other.

12. A camera module, comprising:
a first lens module having a first optical axis;
a second lens module having a second optical axis intersecting the first optical axis;
a first optical path converting member configured to convert a path of incident light to a first optical path connected to the first optical axis and a second optical path connected to the second optical axis; and
a first driving device configured to drive the first optical path converting member such that one optical path among the first optical path and the second optical path is selected.

13. The camera module of claim 12, wherein the first lens module and the second lens module are configured to have different optical characteristics.

14. The camera module of claim 12, further comprising a second optical path converting member configured to refract or reflect light reflected from an object to the first optical path converting member.

15. The camera module of claim 14, further comprising a second driving device configured to drive the second optical path converting member in a direction intersecting an optical axis of the incident light.

16. The camera module of claim 12, wherein an angle formed between the first optical axis and the second optical axis is less than 90 degrees.

17. The camera module of claim 12, further comprising:
a first image sensor corresponding to the first optical axis; and
a second image sensor corresponding to the second optical axis.

18. The camera module of claim 11, further comprising:
a first image sensor corresponding to the first optical axis; and
a second image sensor corresponding to the second optical axis.

* * * * *